(12) United States Patent
Sen et al.

(10) Patent No.: US 10,664,476 B2
(45) Date of Patent: May 26, 2020

(54) BUSHY JOINS TO IMPROVE COMPUTER EFFICIENCY EXECUTING QUERIES

(71) Applicant: MemSQL, Inc., San Francisco, CA (US)

(72) Inventors: Rajkumar Sen, San Mateo, CA (US); Samir Jindel, San Francisco, CA (US); Jack Chen, Cambridge, MA (US)

(73) Assignee: MemSQL, Inc., San Francisco, CA (US)

(*) Notice: Subject to any disclaimer, the term of this patent is extended or adjusted under 35 U.S.C. 154(b) by 721 days.

(21) Appl. No.: 15/352,131

(22) Filed: Nov. 15, 2016

(65) Prior Publication Data

US 2017/0147647 A1    May 25, 2017

Related U.S. Application Data

(60) Provisional application No. 62/258,086, filed on Nov. 20, 2016.

(51) Int. Cl.
*G06F 16/00*    (2019.01)
*G06F 16/2453*    (2019.01)
(Continued)

(52) U.S. Cl.
CPC ...... *G06F 16/24544* (2019.01); *G06F 16/245* (2019.01); *G06F 16/24542* (2019.01); *G06F 16/24557* (2019.01)

(58) Field of Classification Search
CPC .............................................. G06F 16/24544
See application file for complete search history.

(56) References Cited

U.S. PATENT DOCUMENTS 8,086,598 B1 * 12/2011 Lamb ................ G06F 16/24544
                                                    707/714
8,438,152 B2    5/2013 Ahmed
(Continued)

OTHER PUBLICATIONS

Sen, Rajkumar, Jack Chen, and Nika Jimsheleishvilli. "Query optimization time: The new bottleneck in real-time analytics." Proceedings of the 3rd VLDB Workshop on In-Memory Data Mangement and Analytics. ACM, 2015. (Year: 2015).*
(Continued)

*Primary Examiner* — Diedra McQuitery
(74) *Attorney, Agent, or Firm* — EIP US LLP

(57) ABSTRACT

A received query is analyzed to provide a set of potential bushy tree operation plans that include the creation of one or more "sub-joins" that provide intermediate resultant "sub-tables", and using these sub-tables as operands in the other predicates of the query. The received query is analyzed to identify "satellite" tables and "seed" tables. A satellite table is a table of the database that is filtered by a selective predicate, and is connected to only one other table in the database via at least one linking predicate, and a seed table is a table of the database that is connected to a satellite table and at least one other table. Multiple candidate operation plans are formulated as bushy trees that include a sub-join of each seed table and its connected satellite table. A least cost operation plan is selected for execution from among these candidate operation plans and the conventional least cost linear operation plan based on the costs associated with each operation plan.

21 Claims, 5 Drawing Sheets

(51) Int. Cl.
*G06F 16/2455* (2019.01)
*G06F 16/245* (2019.01)

(56) References Cited

U.S. PATENT DOCUMENTS

| | | | |
|---|---|---|---|
| 2004/0220923 A1* | 11/2004 | Nica | G06F 16/24544 |
| 2006/0167865 A1* | 7/2006 | Andrei | G06F 16/24544 |
| 2008/0033914 A1* | 2/2008 | Cherniack | G06F 16/24544 |
| 2009/0112793 A1* | 4/2009 | Ahmed | G06F 16/2456 |
| 2014/0280035 A1* | 9/2014 | Fraser | G06F 16/24542 707/718 |

OTHER PUBLICATIONS

"Cost-Based Query Transformation in Oracle", Rafi Ahmed et al. VLDB '06, Sep. 12-15, 2006, Seoul, Korea.
"Query Optimization in Microsoft SQL Server PDW", Srinath Shankar et al., SIGMOD '12, May 20-24, 2012, Scottsdale, Arizona.
"Of Snowstorms and Bushy Trees", Rafi Ahmed et al., VLDB '14, Sep. 1-5, 2014, Hanzhou, China.

* cited by examiner

"Get all items tha were:
   sold in stores in a particular month and year [Apr 2000]; and
   returned and re-purchased by the customer through the catalog through the catalog channel in the same month and in the six following months [Apr - Oct 2000] ...
Group this information by item and store." (TPC-DS, query 25.)

FIG. 1A

```
SELECT .......
FROM store_sales ss,
store_returns sr,
catalog_sales cs,
date_dim d1,
date_dim d2,           ← 110
date_dim d3,
store s,
item i
WHERE d1.d_moy = 4        ← 130
AND d1.d_year = 2000           ← 120
AND d1.d_date_sk = ss_sold_date_sk
AND i_item_sk = ss_item_sk
AND s_store_sk = ss_store_sk
AND ss_customer_sk = sr_customer_sk
AND ss_item_sk = sr_item_sk
AND ss_ticket_number = sr_ticket_number
AND sr_returned_date_sk = d2.d_date_sk
AND d2.d_moy BETWEEN 4 AND 10
AND d2.d_year = 2000           → 130
AND sr_customer_sk = cs_bill_customer_sk
AND sr_item_sk = cs_item_sk
AND cs_sold_date_sk = d3.d_date_sk
AND d3.d_moy BETWEEN 4 AND 10
AND d3.d_year = 2000           → 130
```

FIG. 1B

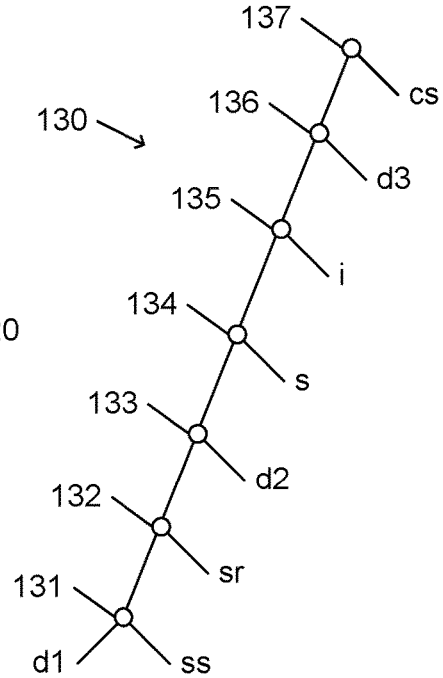

FIG. 1C

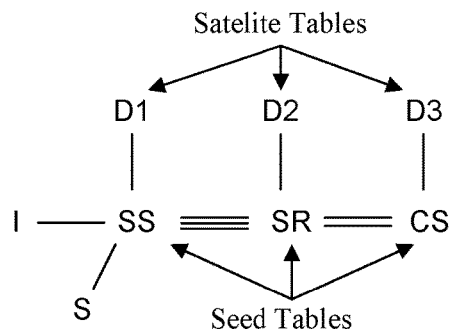

FIG. 3A

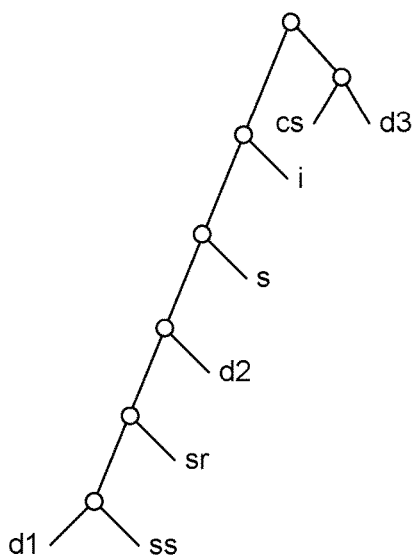

FIG. 3B

```
SELECT .......
FROM store_sales ss,
store_returns sr,
date_dim d1,
date_dim d2,
store s,
item i,
(SELECT *
    FROM catalog_sales cs,
        date_dim d3
WHERE cs_sold_date_sk = d3.d_date_sk
AND d3.d_moy BETWEEN 4 AND 10
AND d3.d_year = 2000) sub
WHERE d1.d_moy = 4
AND d1.d_year = 2000
AND d1.d_date_sk = ss_sold_date_sk
AND i_item_sk = ss_item_sk
AND s_store_sk = ss_store_sk
AND ss_customer_sk = sr_customer_sk
AND ss_item_sk = sr_item_sk
AND ss_ticket_number = sr_ticket_number
AND sr_returned_date_sk = d2.d_date_sk
AND d2.d_moy BETWEEN 4 AND 10
AND d2.d_year = 2000
AND sr_customer_sk = sub.cs_bill_customer_sk
AND sr_item_sk = sub.cs_item_sk
```

FIG. 3C

```
SELECT ...
FROM a11, a12, a13, a14, a15, a16, a17, a18, a19
    WHERE a11.x = a12.y
    AND a11.y = a13.z
    AND a12.z = a14.x
    AND a11.a = a15.x
    AND a13.a = a16.a
    AND a13.b = a17.b
    AND a14.a = a18.a
    AND a15.a = a19.a
    AND a16.f = 1
    AND a18.c = 2
    AND a19.c = 3
    AND a17 IN (3, 4, 5)
```
FIG. 4A
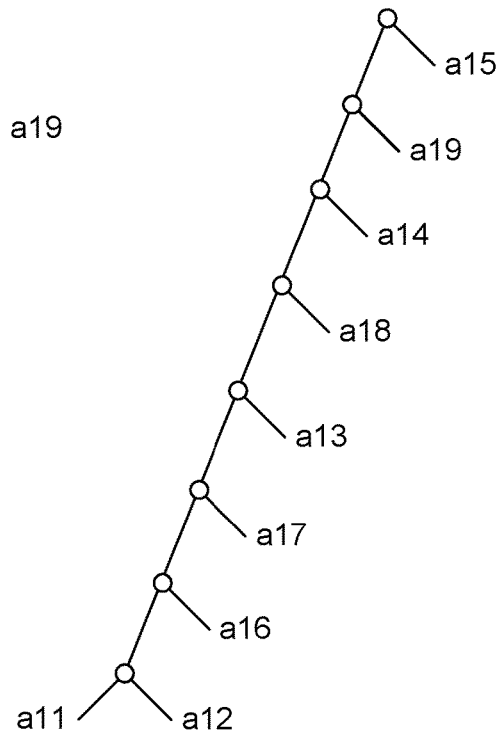
FIG. 4B
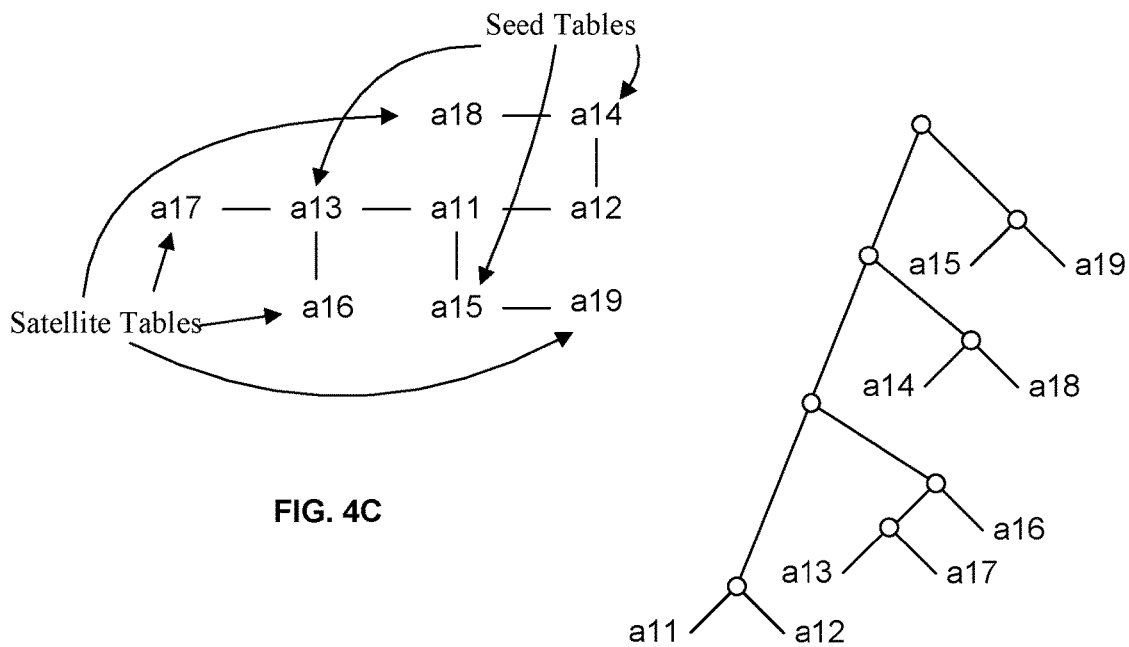
FIG. 4C
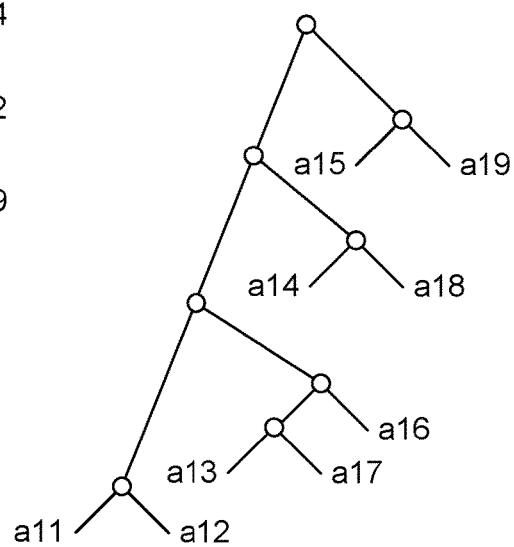
FIG. 4D

BUSHY JOINS TO IMPROVE COMPUTER EFFICIENCY EXECUTING QUERIES

This application claims the benefit of U.S. Provisional Patent Application 62/258,086, filed 20 Nov. 2015.

BACKGROUND AND SUMMARY OF THE INVENTION

This invention relates to the field of database management and query processing, and in particular to a method for improving a computer's efficiency in executing a received query by recasting the query using one or more bushy joins of the tables involved in the received query.

The use of computer databases to organize information is ever-growing. This growth includes the expansion of fields of data and the relationships among these various fields of data. Correspondingly, the complexity of queries submitted by users to retrieve specific information based on such relationships has also increased.

Conventionally, a database comprises a number of Tables that include rows and columns, each row being an identifiable "instance" of a record in the table, and each column being the value of the attributes included in each row. Data is retrieved from the database by executing a query that defines the selection of records from the database, and the operations that are to be performed on these selected records. The selection of records is performed by applying the search criteria, or "predicates" to the tables of the database. Predicates may address one or two tables. A predicate that addresses one table is termed a "single-table predicate", wherein a particular value is specified for selection from the table. For example, single-table predicates include such terms as "Table.column=Constant", "Table.column IN (Constant1, Constant 2, . . . ", "Table.column BETWEEN (Constant1, Constant2)", and so on.

A predicate that addresses two tables is termed herein a "linking predicate", to distinguish it from the selective predicate. A linking predicate establishes a connection between the two tables, and is typically of the form "Table1.columnA=Table2.columnB", which filters both tables for records in which the value of columnA in Table1 is the same as the value of Table2. Applying a linking predicate forms a table that includes all of the matched records of Table1 and Table2, and is termed a "join" of these tables. A join of tables may also be formed without a predicate, wherein all of the entries of Table2 are joined with Table1.

Queries are typically executed by a sequential execution of the predicates and other operations (such as joins without predicates) in the query, wherein each predicate or other operation is applied to the table formed by the previous predicates or operations in the query. Consequently, the order of processing each join of a query can significantly affect the speed at which the computer that executes the query will provide a result. For example, in a query that addresses two different tables in the database, executing a predicate in the query on a first table that substantially reduces the number of 'candidate' records in the resultant table before executing a predicate related to the second table will significantly reduce the number of records that the computer must compare to the second table. Conversely, executing a predicate on the first table that is not expected to significantly reduce the number of candidate records in the resultant table will not significantly reduce the number of records that need to be compared to the second table.

Accordingly, the order of executing predicates in the query is generally determined based on the expected reduction in 'costs' of executing subsequent predicates. The total cost of sequentially executing a query is commonly determined based on the cost of executing each predicate, and the cost of accessing and moving data, in light of the order of execution of the predicates. The costs of different orders of execution are determined, and an order of execution that minimizes this cost is selected as the preferred order to execute the particular query. The order of execution of predicates in the query may be represented as an "operation tree", an "operation plan", or a "query tree". The sequential execution of each predicate on the results of the execution of each prior predicate results in a "linear" join tree, such as illustrated in FIG. 1C (detailed further below).

In addition to controlling the order of executing predicates in a query, conventional query processors may also optimize performance by such techniques as "Column Elimination" transformation, which removes any columns in the resultant table that are not subsequently used in the query, and "Predicate Pushdown", which finds predicates that can be "pushed down" in the operation tree to be applied to a smaller resultant table. Other techniques for optimizing linear operation trees are common in the art. As used herein, the terms 'optimization' and 'least cost' are used loosely, and should be interpreted as the application of techniques that are either known to reduce costs, or are structured to assess a variety of options and select the least costly option from among the selected variety of options.

U.S. Pat. No. 8,438,152, issued 7 May 2013 to Rafi Ahmed, (hereinafter Ahmed) and incorporated by reference herein, discloses that improvements in performance may be obtained by recasting a linear join tree into a bushy join tree. The bushy tree comprises two or more independent sub-trees that are joined to form the query. Ahmed addresses "snowstorm" queries that can be characterized as having large 'fact' tables and small 'dimension' tables, and discloses that the sub-joins should be formed by joining large fact tables to small dimension tables, and then choosing the combination of such sub-joins that produces the least costly tree.

However, in a typical query that addresses multiple large fact tables, the evaluation of all such combinations is likely to consume a substantial amount of 'pre-processing' to determine the least costly tree. Ahmed does not provide specific guidance for further selecting candidate sub-joins; presumably, all joins between large and small tables should be considered and all the trees formed by different combinations of such joins should be evaluated to select the least costly tree.

In a subsequent technical paper ("Of Snowstorms and Bushy Trees", Ahmed et al., *Proceedings of the VLDB Endowment*, Vol. 7, No. 13, included by reference herein), Ahmed notes that a query with five tables provides 1,680 possible permutations (using Ahmed's formula, a query with six tables will provide 30,340 possible permutations). Ahmed discloses that this number can be substantially reduced by pre-grouping the tables, but does not disclose techniques for such pre-grouping. It appears that each large table, with its related small tables, would form each group. However, a query that addressed five large tables would still have 1,680 possible permutations to be evaluated, the cost of which would likely preclude the application of Ahmed's bushy join recasting process.

It would be advantageous to further improve the performance of a computer in executing a database query by providing a bushy tree recasting process that substantially reduces the number of bushy tree combinations that need to be evaluated and compared. It would also be advantageous to provide a bushy tree recasting process that is not dependent on the relative sizes of the tables, and is not limited to the recasting of "snowstorm" queries. By efficiently selecting the bushy tree combinations that are to be evaluated and compared, a bushy tree combination can be provided for execution of the database query that substantially enhances the database management system's performance by reducing the total processing time, the total data transfer time, or other costs in responding to the received query.

These advantages, and others, can be realized by recasting an original query into a set of potential bushy tree operation plans that include the creation of one or more "sub-joins" that provide intermediate resultant "sub-tables", and using these sub-tables as operands in the other predicates of the query. That is, as contrast to the conventional ordering of joins in the received query by providing a least-cost linear join tree corresponding to the received query, the process of this invention includes the efficient selection of sub-tables that are the result of applying predicates of the received query to select tables of the database, and then using these sub-tables as components of a rewritten operation plan that reduces the costs associated with executing the received query by the database management system. As contrast to the prior art technique of forming sub-joins of every 'large' table and its associated 'small' tables, the process of this invention selects joins that are likely to improve the execution of the query (hereinafter "selective joins") without regard to the size of the tables being joined, and without regard to the 'type' of query being processed.

In an embodiment of this invention, a received query is analyzed to identify "satellite" tables and "seed" tables. A satellite table is a table of the database that is filtered by a selective predicate, and is connected to only one other table in the database via at least one linking predicate, and a seed table is a table of the database that is connected to a satellite table and at least one other table. Multiple candidate operation plans are formed as bushy trees that include a sub join of each seed table and its connected satellite table. A least cost operation plan is selected for execution from among these candidate operation plans and the conventional least cost linear operation plan based on the costs associated with each operation plan.

BRIEF DESCRIPTION OF THE DRAWINGS

The invention is explained in further detail, and by way of example, with reference to the accompanying drawings wherein:

FIGS. 1A-1C illustrate an example search statement, a corresponding query, and a linear search tree corresponding to the query.

FIGS. 3A-3C illustrate a relationship graph associated with the query of FIG. 1B, a bushy search tree corresponding to query using techniques of this invention, and a nested query corresponding to the bushy search tree.

FIGS. 4A-4D illustrate another example query and corresponding linear search graph and bushy search graph, and a nested query corresponding to the bushy search graph.

Throughout the drawings, the same reference numerals indicate similar or corresponding features or functions. The drawings are included for illustrative purposes and are not intended to limit the scope of the invention.

DETAILED DESCRIPTION

Figure 2:
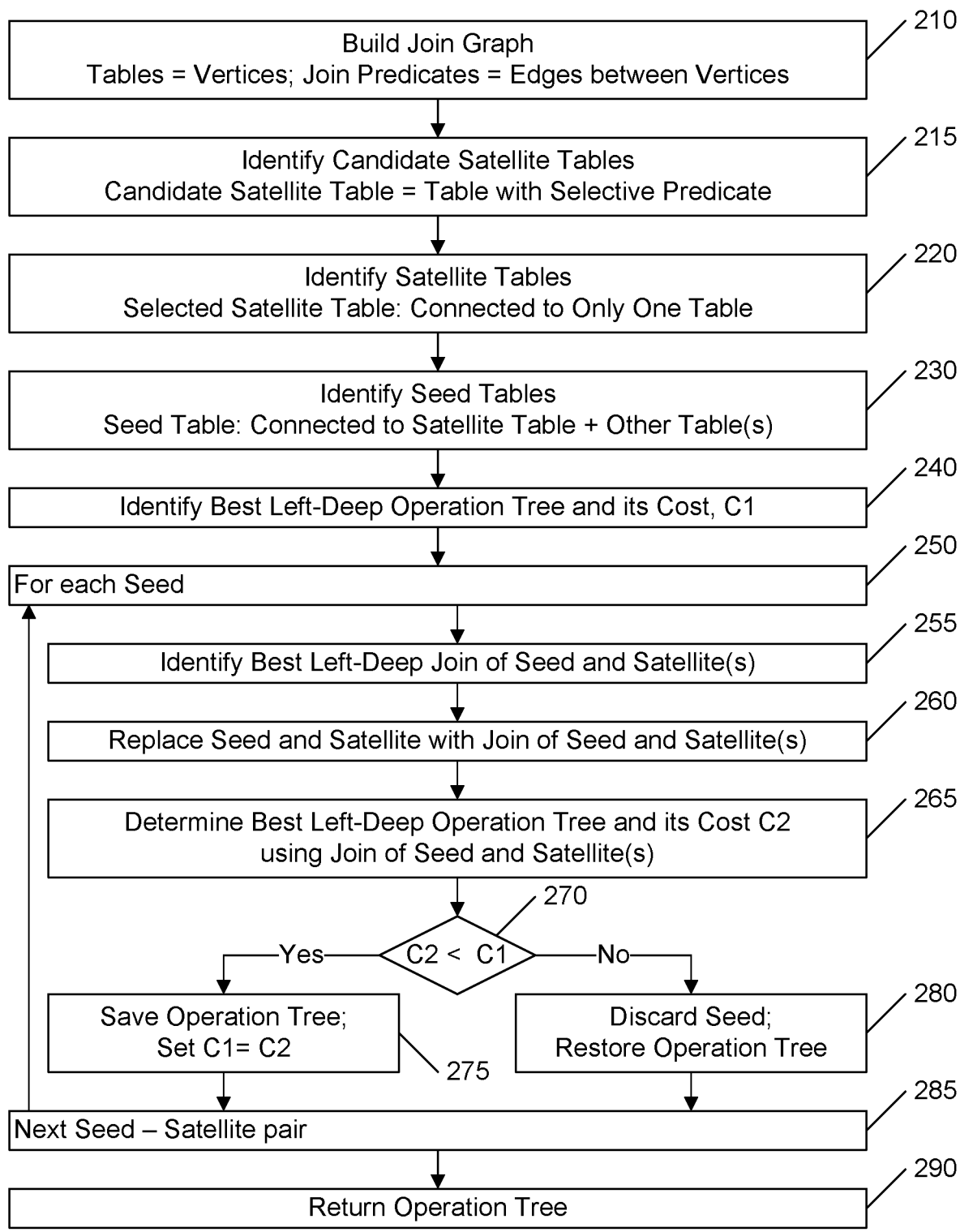
FIG. 2 illustrates an example flow diagram for creating bushy trees corresponding to a query in accordance with techniques of this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the field of database management, the TPC (Transaction Processing Performance Council is "a non-profit corporation founded to define transaction processing and database benchmarks and to disseminate objective, verifiable TPC performance data to the industry". One of the functions of the TPC is to define an example complex database system and a set of benchmark search tasks for performing operations on this database system. Researchers, developers, vendors, etc. of database management systems are invited to apply their 'products' to the benchmark search tasks to evaluate the performance of the products, and to compare their performance with other products that were applied to the same search tasks.

TPC-DS (TPC-Decision Support) defines a database system for use by a business enterprise that "must manage, sell and distribute products (e.g., food, electronics, furniture, music and toys etc.). It utilizes the business model of a large retail company having multiple stores located nation-wide. Beyond its brick and mortar stores, the company also sells goods through catalogs and the Internet. Along with tables to model the associated sales and returns, it includes a simple inventory system and a promotion system." (TPC Benchmark DS Standard Specification, Version 1.4.0, August 2015.)

The TPC-DS specification defines each of the columns or "fields" in each table of the database. For example, a Table "ss" identifies store sales (Table "ss"), with each row corresponding to a particular sale of an item to a customer, and the columns identifying the store, the date of the sale, the item that was sold, the price of the item, an identifier of the customer, and so on. In like manner, the Table "cs" that identifies catalog sales includes similar information, and the Tables "sr" and "cr" identify items that were returned to the stores and catalog outlet, respectively.

FIG. 1A illustrates an example search task, corresponding to query 25 of TPC-DS. (For clarity, the TPC-DS "query" is herein defined as "search task", and the term "query" is reserved for the actual statements that are provided to the database management system to solve the search task.) In this example, the search task is to find items that were sold at the stores during a particular month, returned to the store, and re-purchased via catalog sales during the next six months. Results are to be provided by item and store.

The TPC-DS query 25 also includes "operations" that are to be applied to the records that satisfy the search task, such as determining the profit and loss at each store and at the catalog outlet for each item. However, because this application addresses techniques and processes that improve the efficiency of a database management system in the retrieval and compilation of records that satisfy a given search task, the subsequent operations on the retrieved records are not discussed or illustrated in this application.

To satisfy the search task of FIG. 1A, a query is formed to be executed on a database management system, as illustrated in FIG. 1B. In this example, the particular month of store sales of interest is April (4) 2000, and the six month period of store returns and catalog sales is April through October (4-10) 2000.

In FIG. 1B, the initial block 110 of text defines the tables and variables used within the query ("FROM . . . "). Fact tables ss, sr, cs are identified, and dimension tables d1, d2, and d3 are defined to reference date variables that are used within the query, as well as local variables s and i to reference the particular store and item, respectively, and are used for subsequent operations on the retrieved records. For example, the operation may include "sum (profits) for each store, s", which will access/organize the records that satisfy the combination of date criteria by each store identifier, s. The date dimension tables include a row for each calendar day, and contains fields that facilitate identifying particular features of each day, such as the month, the year, the day of the week, whether the day is a holiday or the day after a holiday, and so on.

The predicates of the query are illustrated in the second block 120 of text (WHERE . . . ). Selective predicates 130 define the values of the dates. Date d1 is defined as all of the days in April 2000 (d1.d_moy=4; d1.d_year=2000); and dates d2 and d3 are defined as being all of the days between April 2000 and October 2000 (d_moy=BETWEEN 4 AND 10). The database management system creates a range of Julian dates for the specified months and appends the year to create a field value (d_date_sk; "date search key") for d1, d2, and d3 that identifies the range of dates for each of d1, d2, and d3.

The query is structured to filter the store sales to April 2000 (d1.d_date_sk=ss_sold_date_sk), the store returns to April-October 2000 (sr_return_date=d2.d_date_sk), and the catalog sales to April-October 2000 (cs_sold_date_sk=d3.d_date_sk).

The remaining predicates ("linking predicates") in the query define the relationships that must be satisfied for the results to contain all of the records that satisfy the given constraints of the search task. For example, "ss_customer_sk=sr_customer_sk" imposes a constraint, or filters the records, such that in each resultant join, the store sale (ss) and return (sr) corresponds to the same customer; "ss_item_sk=sr_item_sk" imposes the additional constraint that the same item is sold and returned, and "sr_item_sk=cs_item_sk" imposes the constraint that the same item is sold via a catalog sale (cs).

As noted above, the order of execution of the predicates 120 of the query will significantly affect the "cost" of executing this query in predicates of how quickly all the records that satisfy the query are identified, how much data must be communicated (which affects the consumed bandwidth), and so on. For example, if the "ss_item_sk=sr_item_sk" predicate is executed before any of the other predicates, the returned result would be the records of every item that was ever sold and returned, without regard to any other factors, such as the dates of the sales or returns, whether there's a correspondence between the purchaser and the returner and so on. (If a million copies of a particular item were sold, and one copy was returned, all one million records of the sales of that item would be returned as the result.) Accordingly, such a predicate would not be considered a "selective" predicate, per se.

As noted above, techniques for ordering the sequential execution of predicates in a query based on expected "costs" are well known in the art, and are generally based on the meta-data that is commonly maintained for each table, such as the distribution of values of the search keys. Based on these distributions, it is possible to estimate the number of records that will be returned in response to a particular predicate of the query. For example, knowing the distribution of store sales over time, it is possible to estimate (or determine) the number of records that will be returned in response to "d1.d_date_sk=ss_sold_dat_e_sk" if the date range is April 2000. If the store sales table has been previously filtered, such as by the predicate ""ss_customer_sk=sr_customer_sk", and reduced by 40%, the subsequent estimate of the number of store sales in April 2000 would correspondingly be reduced.

In the example of FIG. 1B, and the characteristics of the TPC-DS databases, the particular sequence that is illustrated in FIG. 1C is estimated as providing a least cost result, using conventional cost minimization techniques such as discussed above.

FIG. 1C illustrates the order of execution of the predicates in the query of FIG. 1B as an operation tree that is a "linear join tree" 130, wherein each vertex represents a join of the table to the left and right of the join. In this example, the join tree is represented as a "left-deep" tree. The order of execution of the joins in the join tree of FIG. 1C is from the bottom up, each join providing an intermediate (or "current") result (or table) upon which the next predicate in the query is executed. This join tree may also be represented as (d1, ss, sr, d2, s, i, d3, cs), wherein the joins are applied left-to-right.

In this example, the first join 131 to be executed is the join of d1 and ss, using the predicate(s) in the query that relate to d1 and ss (d1.d_date_sk=ss_sold_date_sk). This produces an intermediate result that includes only the store sales that occurred in April 2000 (which substantially reduces the records of the table ss that must be applied to the subsequent joins).

The next join 132 applies the predicates in the query that relate to the store returns (sr) and the current results (d1, ss). In this case, the predicates that are applied are "ss_customer_sk=sr_customer_sk"; "ss_item_sk=sr_item_sk"; and "ss_ticket_number=sr_ticket_number", and the resultant table will be all of the store sales (in April 2000) of each item to each customer that have a matching store return (d1, ss, sr), regardless of the date of return. Again, this is likely to substantially reduce the number of records from ss and sr that need to be addressed in subsequent joins.

This joining process continues at join 132, which joins the store sales and store returns that have a common customer ("ss_customer_sk=sr_customer_sk"), common item identifier ("ss_item_sk=sr_item_sk"), and common ticket number ("ss_ticket_number=sr_ticket_number"). At 133, the date of returns is limited to d2; at 134 and 135, the particular store s and item i are added to the join (for subsequent operations).

At 136, date d3 is added to the join; and at 137, table cs is added to the join by applying all of the predicates related to cs ("sr_customer_sk=cs_bill_customer_sk"; "sr_item_sk=cs_item_sk"; and "cs_sold_date_sk=d3.d_date_sk") to the current intermediate join (d1, ss, sr, d2, s, i, d3), thereby producing a result (d1, ss, sr, d2, s, i, d3, cs) that satisfies the query of FIG. 1B and the search task of FIG. 1A: "Get all items that were: sold in stores in a particular month and year [April 2000]; and returned and re-purchased by the customer through the catalog through the catalog channel in the same month and in the six following months [April-October 2000]".

Of particular note, join 136 of date d3 is a "Cartesian product join", which is a costly join, because date d3 does not impose a further constraint on the intermediate join (d1, ss, sr, d2, s, i). However, forming this join is less costly than forming a join with cs without a date constraint.

FIG. 2 illustrates an example flow diagram of a bushy tree recasting technique for selecting candidate partial queries that substantially reduces the number of partial query combinations that are to be evaluated to determine a least costly bushy join tree, if any.

As noted above, techniques are commonly available for providing optimized linear join trees. A linear join tree may be a left-deep join tree, such as illustrated in FIG. 1C, or a right-deep join tree, which appears as a mirror-image of the left-deep join tree. For ease of reference, herein, a left-deep join tree will be used hereinafter as the example linear join tree.

The bushy join technique of this invention is configured to provide one or more partial queries that produce one or more sub-joins, wherein each sub join is an optimized left-deep join tree, and each sub-join is joined to an independent left-deep join tree. As will be seen hereinafter, this technique is not dependent upon the size of the tables, and is applicable regardless of the type of query being processed.

The process of FIG. 2 uses particular terminology as defined herein:

- "join graph" is a graph wherein each table is a vertex, and each join predicate (term) is an edge between the tables;
- "candidate satellite table" is a table with at least one "selective predicate" on it. A selective predicate includes such predicates as "<column>=Constant", "<column> IN (Constant1, Constant 2, . . . ", "<column> BETWEEN (Constant1, Constant2)", and so on;
- "satellite table" is a candidate satellite table that is connected to only one other table in the graph (although the connection may include multiple join predicates); and
- "seed table" is a table that is connected to at least two distinct tables, at least one of which is a satellite table.

The process of FIG. 2 will be described with reference to FIGS. 3A-3C, which illustrate a recasting of the linear operation tree of FIG. 1C.

At 210, the Join Table is formed, illustrated in FIG. 3A. Each of the tables S, I, D1, D2, D3, SS, and SR form vertices and each predicate in the query forms an edge between the vertices. For example, there is one edge 310 between vertex D1 and SS, corresponding to the predicate "d1.d_date_sk=ss_sold_date_sk", and three edges 320 between tables SS and SR, corresponding to "ss_customer_sk=sr_customer_sk"; "ss_item_sk=sr_item_sk"; and "ss_ticket_number=sr_ticket_number".

At 215, candidate satellite tables (tables with selective predicates on them) are identified as D1, D2, D3, corresponding to the predicates that set D1 to April 2000 and D2 and D3 to April-October 2000. All other predicates in the query have multiple table values as arguments.

At 220, satellite tables are identified as the candidate satellite tables that are adjacent (connected) to only one other table. In this example, all three of the candidate satellite tables D1, D2, and D3 are each connected to only one table, SS, SR, and CS, respectively.

At 230, the seed tables are identified. The seed tables are tables that are connected to a satellite table and at least one other table. In the example of FIG. 3A, the seed tables are SS, SR, and CS. The seed tables are used to identify candidate joins for a bushy join tree.

Of particular note, the size of each of these tables is immaterial to their selection as seed tables. Also of note, the constraints on the definitions of satellite and seed tables substantially reduces the number of possible combinations and permutations for forming busy trees for evaluation and comparison.

Although these constraints limit the number of combinations to be evaluated, experience has demonstrated that the set of seed tables generally provides bushy join trees that substantially reduce the execution time of 'real-world' queries, particularly those having multiple fact tables. This is likely because each seed table is filtered by a table that contains a selective predicate, and thus highly likely to be reduced in size by the intermediate join. The prior art bushy join technique does not take into account whether particular trees contain selective predicates.

The loop 250-285 will assess the cost of each of the join of the seed table and its connected satellite table(s), but before the loop is executed, the cost of the best left-deep join tree is determined, at 240 using conventional techniques that determine the order of joins that provide the least cost, as well as other optimization techniques known in the art (e.g. Predicate Pushdown and Column Elimination, and others, as detailed above). The cost, C1, of the left-deep join tree is used as an initial baseline for comparison with the costs of the bushy join trees.

Within the loop 250-280, at 255, a join of the seed and satellite tables is formulated and its cost is estimated. This join may only include the application of a single predicate, or multiple predicates. Accordingly, the conventional optimization techniques for forming a least costly join tree are applied to estimate the cost of this join (hereinafter "sub-join") of the seed and satellite tables.

At 260, the current operation tree is modified to include the availability of the sub-join of the seed and satellite tables. That is, in the query corresponding to the current operation table, all predicates that remain to be applied to either the seed table or the satellite table are modified to be applied to the sub-joined table, and the predicates that were applied in the sub-join are removed from the query.

At 265, the cost C2 of the recast query (entire query, including sub-join, herein termed the operation tree, to distinguish it from the sub join tree(s)) is determined. Again, this cost is determined by finding the least cost left-deep tree, wherein the sub-join table forms the "leaf" or right side of the join in the operation tree. In estimating the cost of the operation tree, the cost of forming the sub-join is included in the cost of joining the sub-join.

At 270, the cost C2 is compared to the baseline cost C1. If the cost C2 is less than the baseline cost C1, this operation tree is defined as the current operation tree, and the baseline cost C1 is updated to be the cost C2 of this operation tree, at 275. That is, the "current operation tree" is the least costly operation tree discovered thus far.

If the cost C2 of using the sub-join is more expensive than the cost C1 of the current operation tree, this sub join is 'discarded' from further consideration, at 280, and the current operation tree is restored to its original form before the replacement of tables at 260. That is, each sub join of the seed-satellite(s) at 260 replaces the seed and satellite tables in the current operation tree, and when this sub join is not selected for use in the current operation tree, the operation tree is restored to its prior state, at 280.

At 285, the process loops to 250, and the next seed-satellite pair is assessed. When the loop terminates, at 285, the current operation plan is the least cost operation tree of the trees that were assessed, and this operation tree is returned for execution to satisfy the query of FIG. 1B, and, correspondingly, the search task of FIG. 1A.

In the example query of FIG. 1B, the process of FIG. 2 identified that a replacement of the sequential join of d3, then cs, in the left-deep operation tree (d1, ss, sr, d2, s, i, d3, cs) with a sub join of d3 and cs (d1, ss, sr, d2, s, i, (d3, cs)), as illustrated in FIG. 3B, the cost of executing the query of FIG. 1B will be substantially reduced (in this example, by a factor of 10.1).

FIG. 3C illustrates an example recasting of the query of FIG. 1B in accordance with the use of the sub join of d3 and cs in the operation tree of FIG. 3B. As illustrated by the bold text, a join of d3 and cs is performed as a separate SELECT operation, with the resultant joined table identified as table "sub", and the prior predicates on table cs that were not applied in the join of d3 and cs are modified to refer to "sub.cs" ("sr_customer_sk=sub.cs_bill_customer_sk"; "sr_item_sk=sub.cs_item_sk"). The predicate "cs_sold_date_sk=d3.d_date_sk" is moved from the "outside select" to the "inside select" (the bolded SELECT query).

Of particular note, this recasting of the query only requires the creation of a sub-select that forms the join of the seed cs and satellite d3, and the aforementioned adjustment of the predicates that apply to cs or d3. The optimization of the inner sub-select and outer select is performed automatically using conventional left-deep optimization techniques, without modification. That is, the least cost sub-tree will be used, and the least cost operation tree using this least cost sub-tree will be used without modification of the conventional processes used to determine least cost trees.

FIGS. 4A-4D illustrate another example of a recasting of a left-deep join tree into a bushy tree.

FIG. 4A illustrates a received query that accesses nine tables, a11 through a19, and FIG. 4B illustrates a left-deep join tree defined using conventional least-cost join techniques based on particular characteristics of these tables.

FIG. 4C illustrates a join graph wherein the tables a11-a19 are vertices, and the predicates of FIG. 4A are edges between the tables. Consistent with the flow diagram of FIG. 2, tables a16, a17, a18, and a19 are identified as candidate satellite tables because they each include at least one selective predicate ("a16.f=1", "a17 IN (3, 4, 5)", "a18.c=2", and "a19.c=3", respectively). Additionally, each candidate satellite table a16, a17, a18, a19 is connected to only one other table (a13, a13, a14, a15, respectively), and are thus identified as true satellite tables.

The seed tables that are connected to these satellite tables are a13, a14, and a15 and at least one other table (a11 (or a16, a17), a12, and a11, respectively). The potential sub join of each of these seed tables. The sub join of a13 will include a13, a16, and a17; the sub join of a14 will include a14 and a18; and the sub join of a15 will include a15 and a19.

After determining the cost of each of these potential sub joins and the cost of the resultant operation tree using these sub-joins, it was determined that the use of each of these potential sub joins reduce the cost of the resultant operational tree. The resultant least cost operational tree (a11, a12, (a13, a17, a16), (a14, a18), (a15, a19)) is illustrated at FIG. 4D.

Of particular note, with respect to the prior art bushy tree techniques, the size of any of the tables a11-a19 was immaterial to this bushy tree determination. Perhaps most significantly, sub joins based on tables a11 and a12, and combinations thereof, were not included in the determination of the least cost operation tree of FIG. 4D. As noted above, the seed tables are known to be directly connected to a table upon which a selective predicate is applied, and are likely to be substantially filtered by the sub-join, and the determination of the optimal join trees for these potential sub-joins is straightforward. Contrarily, the non-seed, non-satellite tables (a11, a12) are only indirectly connected to the tables that are filtered by selective predicates, and the estimated benefit achievable by a sub join of these tables, particularly in view of the use of a bushy tree, will be costly to determine, compared to the benefit achievable by the sub joins of the seed tables.

Figure 5:
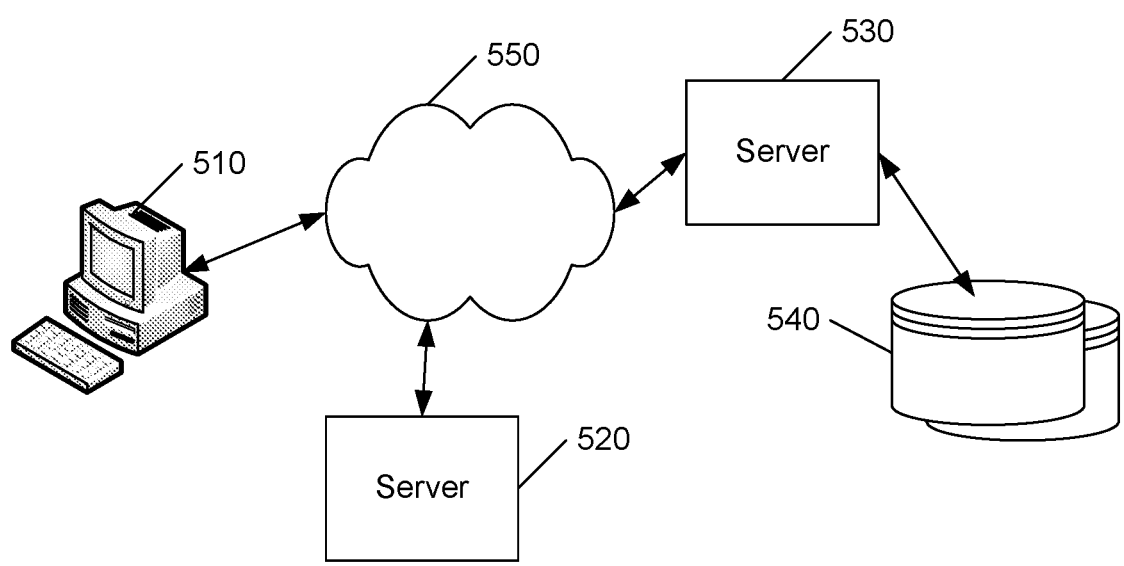
FIG. 5 illustrates a block diagram of an example database access system.

FIG. 5 illustrates an example database access system within which the process of FIG. 2 may be embodied. The system includes a client device 510 that may be used to initiate a query, or initiate a process that subsequently forms a query for obtaining data from a database 540. In a large database system, the queries typically address multiple tables in the database 540, and the order of accessing each table will generally have a significant impact on the speed and efficiency of executing the query.

A network 550 is used to provide communications among the components of the database access system, including servers 520 and 530. The network 550 may a local area network that provides communications within an organization, such as a corporation, or it may be a wide area network, such as the Internet, or it may include a combination of both. One of skill in the art will recognize that there may be many servers, clients, and databases on the network 550.

The example server 530 provides an interface to the database 540, and in some embodiments, may provide the actual execution of the query. The example server 520 may provide an interface between the client device 510 and the server 530. Each server includes one or more processing systems and non-transitory computer-readable medium (memory). The memory may contain stored programs, stored data, and memory allocated for the execution of the program and storing results during the execution. Each server also includes communication interfaces for transmitting and receiving information to and from the network 550 or other remote systems.

In an embodiment of this invention, the server 530 may receive the query from the client device 510 and, if the query addresses multiple tables in the database 540, may preprocess the query to improve the efficiency of the execution of the query by creating and evaluating potential queries that include bushy joins using some or all of the principles of this invention. In an example embodiment, the server 530 is configured to receive a first query that identifies a plurality of predicates that are to be applied to multiple tables of the database 540 to select particular records in the database.

The processing system of the server 530 analyzes the first query to identify one or more satellite tables, each satellite table being a table of the database that is filtered by a selective predicate in the first query, and is connected to only one other table in the database via at least one linking predicate of the first query, and to identify one or more seed tables, each seed table being a table of the database that is connected to a satellite table and at least one other table.

The processing system then identifies a plurality of candidate operation plans corresponding to the first query, each candidate operation plan being a bushy tree join plan that includes a sub join of a corresponding seed table and its connected satellite table, and estimates a cost associated with each operation plan of the plurality of operation plans.

The processing system selects a least-cost operation plan based on the cost associated with each operation plan and the cost associated with a linear join operation plan, and submits this operation plan for execution on the database server 520 in response to the receiving of the first query.

One of skill in the art will recognize that the example embodiment of FIG. 5 is merely one possible configuration of a database access system. In some embodiments, in lieu of the server 530, the database server 520 may perform the preprocessing to develop a least cost operation plan based on candidate bushy tree joins. In other embodiments, the preprocessing and execution of the operation plan may be performed directly on the client device 510. Accordingly, as used in the claims, the terms "computer system" and "processing system" are to be interpreted as being any computer system or processing system within the database access system, and may include a distributed computing or processing system wherein the tasks are performed on multiple computers or processing elements. In like manner, the term "communication interface" is to be interpreted as including an interface to any form of communication, including interfaces used to communicate information to and from a user.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the process illustrated in FIG. 2 may be applied in an iterative manner, wherein the sub join of the seed table and its connected satellite table is treated as a candidate satellite table. That is, in the example of FIG. 4C, if the sub-join of a15 and a19 is treated as a satellite table, table a11 would become a seed table, and the cost of an operation plan that included a sub join of a11 to the sub join of a15 and a19 would be included in the selection of a least cost operation plan. In like manner, another operation plan could include a sub join of a12 and the subjoin of a14 and a18.

In like manner, as contrast to the "bottom-up" process used in the example above, one of skill in the art will recognize that it is also possible to perform the process in a top-down manner, where bushy joins are created within subjoins created in an outer select. Similarly, the algorithm above incorporates bushy sub joins into the operational tree when considering other possible seed tables. However, introducing one sub-join may affect whether it's useful to take future seed tables, and an alternative embodiment may evaluate all subsets of seed tables together.

Additionally, the algorithm described in the example embodiments evaluates the seed and all its connected satellites in the subjoin. One of skill in the art will recognize that the algorithm could be modified by considering subjoins of the seed and some or all of its connected satellites, based, for example, on additional heuristics and estimates about the join connections and filters.

These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A method for improving performance of a computer system that executes queries related to a database, comprising:

receiving a first query that identifies a plurality of tables in the database, and a plurality of predicates that are to be applied to the tables to select particular records in the database;

estimating a first cost corresponding to the first query using a linear join operation plan, analyzing the first query to identify one or more satellite tables, each satellite table being a table of the database that is filtered by a selective predicate in the first query, and is connected to only one other table in the database via at least one linking predicate of the first query;

identifying one or more seed tables, each seed table being a table of the database that is connected to a satellite table and at least one other table, identifying a plurality of candidate operation plans corresponding to the first query, each candidate operation plan being a bushy tree join plan that includes a sub join of a corresponding seed table and its connected satellite table, estimating a cost associated with each operation plan of the plurality of operation plans;

selecting a least-cost operation plan based on the first cost and the cost associated with each operation plan; and executing the least-cost operation plan on the computer system in response to the receiving of the first query.

2. The method of claim 1, wherein analyzing the first query includes building a join graph of the tables in the first query in which each table is a vertex, and each join predicate between a pair of the tables is an edge.

3. The method of claim 1, wherein each sub-join of each seed table and its connected satellite table includes forming a sub-table corresponding to a join of the seed table and its connected satellite table, and the corresponding bushy join of the operation plan includes a join of the sub-table to a join of other tables of the plurality of tables.

4. The method of claim 3, wherein the join of the other tables of the plurality of tables is a least cost linear join.

5. The method of claim 3, wherein each sub-join is a least cost linear join.

6. The method of claim 1, including identifying at least one sub-join of the seed table and its connected satellite table as another satellite table and including a cost of an operation plan that includes another sub-join of the at least one sub-join and another table of the plurality of tables.

7. A database access system, comprising:
a communication interface that receives a first query that identifies a plurality of tables in a database, and a plurality of predicates that are to be applied to the tables to select particular records in the database;
a processing system coupled to the communication interface that:
estimates a first cost corresponding to the first query using a linear join operation plan,
analyzes the first query to identify one or more satellite tables, each satellite table being a table of the database that is filtered by a selective predicate in the first query, and is connected to only one other table in the database via at least one linking predicate of the first query;
identifies one or more seed tables, each seed table being a table of the database that is connected to a satellite table and at least one other table,
identifies a plurality of candidate operation plans corresponding to the first query, each candidate operation plan being a bushy tree join plan that includes a sub-join of a corresponding seed table and its connected satellite table,
estimates a cost associated with each operation plan of the plurality of operation plans;
selects a least-cost operation plan based on the first cost and the cost associated with each operation plan; and
executes the least-cost operation plan on the computer system;
wherein the communication interface provides results of the execution of the least-cost operation plan by the processing system in response to the receiving of the first query.

8. The database access system of claim 7, wherein the processing system analyzes the first query by building a join graph of the tables in the first query in which each table is a vertex, and each join predicate between a pair of the tables is an edge.

9. The database access system of claim 7, wherein the processing system identifies each operation plan by forming a sub-table corresponding to a join of the seed table and its connected satellite table, and forming a join of the sub-table to a join of other tables of the plurality of tables.

10. The database access system of claim 9, wherein the join of the other tables of the plurality of tables is a least cost linear join.

11. The database access system of claim 9, wherein each sub join is a least cost linear join.

12. The database access system of claim 7, wherein the processing system identifies at least one sub-join of the seed table and its connected satellite table as another satellite table and determines a cost of an operation plan that includes another sub-join of the at least one sub-join and another table of the plurality of tables.

13. The database access system of claim 7, wherein the processing system comprises a server, and the communication interface couples the server to a network.

14. The database access system of claim 7, wherein the processing system comprises a client device.

15. The database access system of claim 7, including the database.

16. A non-transitory computer-readable medium that includes a program that, when executed by a processing system, causes the processing system to:
receive a first query that identifies a plurality of tables in the database, and a plurality of predicates that are to be applied to the tables to select particular records in the database;
estimate a first cost corresponding to the first query using a linear join operation plan,
analyze the first query to identify one or more satellite tables, each satellite table being a table of the database that is filtered by a selective predicate in the first query, and is connected to only one other table in the database via at least one linking predicate of the first query;
identify one or more seed tables, each seed table being a table of the database that is connected to a satellite table and at least one other table,
identify a plurality of candidate operation plans corresponding to the first query, each candidate operation plan being a bushy tree join plan that includes a sub join of a corresponding seed table and its connected satellite table,
estimate a cost associated with each operation plan of the plurality of operation plans;
select a least-cost operation plan based on the first cost and the cost associated with each operation plan; and
execute the least-cost operation plan on the computer system in response to the receiving of the first query.

17. The medium of claim 16, wherein the program causes the processing system to analyze the first query by a process that includes building a join graph of the tables in the first query in which each table is a vertex, and each join predicate between a pair of the tables is an edge.

18. The medium of claim 16, wherein each sub-join of each seed table and its connected satellite table includes forming a sub-table corresponding to a join of the seed table and its connected satellite table, and the corresponding bushy join of the operation plan includes a join of the sub-table to a join of other tables of the plurality of tables.

19. The medium of claim 18, wherein the join of the other tables of the plurality of tables is a least cost linear join.

20. The medium of claim 18, wherein each sub-join is a least cost linear join.

21. The medium of claim 16, wherein the program also causes the processing system to identify at least one sub-join of the seed table and its connected satellite table as another satellite table and determine a cost of an operation plan that includes another sub-join of the at least one sub-join and another table of the plurality of tables.

* * * * *